Nov. 10, 1931. H. JUNKERS 1,831,416
JOINT
Filed Oct. 5, 1925 2 Sheets-Sheet 1

Inventor:
Hugo Junkers
by
Atty.

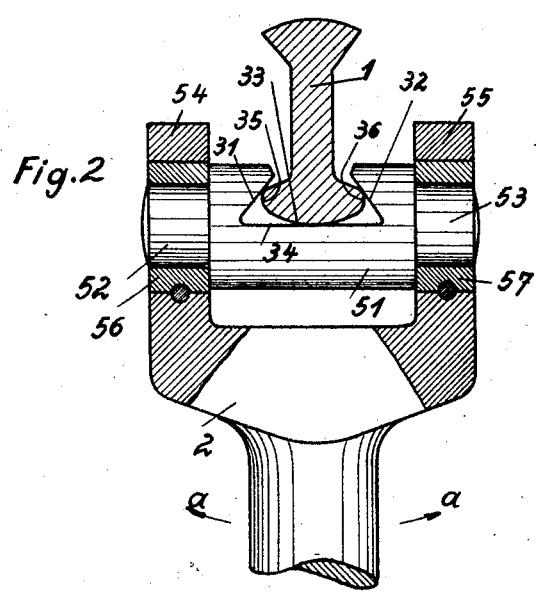

Patented Nov. 10, 1931

1,831,416

UNITED STATES PATENT OFFICE

HUGO JUNKERS, OF DESSAU, GERMANY

JOINT

Application filed October 5, 1925, Serial No. 60,697, and in Germany November 6, 1924.

My invention relates to joints and more particularly to a joint of the oscillating rolling type.

It is an object of my invention to improve a joint of this type with a view to holding the cooperating faces of the joint against any movement except relative rolling. To this end I provide a head on one of the bodies of the joint which is wider than the adjoining portion of its body and on this head I form a curved contact face. On the other body I form a mating contact face which is in rolling contact with, and of different contour from, the contact face on the head, and at each side of the face of different contour I provide converging members embracing the head so as to hold the faces in permanent contact.

All arrangements of this kind hitherto known involve the disadvantage that, whenever all other movements except simple rolling motion shall be rendered impossible, the device becomes comparatively complicated, separate members being required for instance for preventing relative sliding motion of the rolling bodies, relative angular motion, and lifting of one body relative to the other, when a pull is exerted thereon.

According to the present invention all relative movements of the rolling surfaces with the only exception of rolling motion are effectually prevented and a simple and particularly reliable device is obtained, by providing a tooth and gap connection between the two rolling bodies, the flanks of a gap, which converge towards the outside, overlapping the flanks of the tooth projecting into the gap.

In the drawings affixed to this specification and forming part thereof joints embodying my invention are illustrated diagrammatically by way of example.

In the drawings:

Fig. 2 is a similar view of a modified construction.

Figure 1:
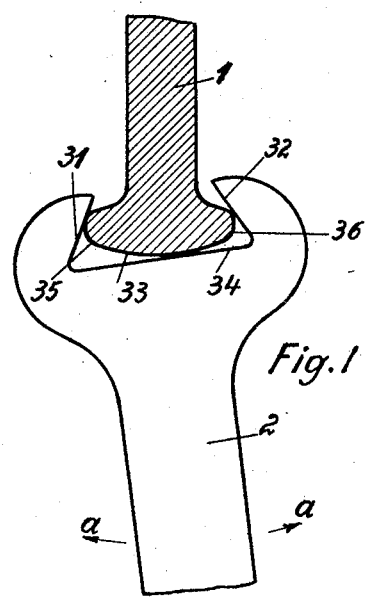
Fig. 1 is a diagram of a joint in accordance with the present invention, one of the cooperating parts being shown in cross-section.

In the drawings 1 and 2 are the two oscillating bodies, the body 1 being here assumed to remain relatively stationary, while body 2 oscillates as indicated by the arrows $a$.

The body 2 has formed at both ends of the rolling surface 34 faces of teeth 31, 32 respectively, these faces converging towards the outside so as to overlap the faces 35, 36 arranged at the ends of rolling surface 33 of body 1. It will appear that in this manner a head is formed on the body 1 which is wider than the adjoining portion of the body. The contact face 33 of the head is curved and the mating contact face 34 on the body 2 is of different contour and in the present instance is shown plane. The normal rules governing toothed gearings allow the cooperating parts to be designed so as to involve a relative rolling motion of the bodies 1, 2 all over the path of oscillation and practically without play, the peculiar form of the cooperating parts at the same time allowing the transmission of tensional forces from one body to the other without the rolling surfaces being enabled to be lifted off one another in any relative position of the parts.

Fig. 2 illustrates a joint constructed substantially in accordance with Fig. 1 and its principal parts are therefore marked with the same letters of reference. In this instance, however, the rolling surface 34 of the body 2 is formed on a separate body 51 which is pivoted to the rolling body 2 by means of pins 52, 53 in such manner that it is enabled to execute small turning movements at right angles to the plane of oscillation of the body 2. By this means here also a uniform distribution of pressure across the entire width of the rolling surfaces 33 and 34 and a uniform distribution of tension over the entire width of the toothed gearing is obtained. The body 51 has the form of a cylinder, in order to enable it to be easily introduced into the undivided arms 54, 55 of the body 2. By means of sleeves 56, 57, introduced into the borings of these arms from without and fixed therein by suitable means such as pins, the body 51 is maintained in correct position.

I wish it to be understood that I do not desire to be limited to the exact details of construction shown and described for obvious modifications will occur to a person skilled in the art.

I claim:—

1. A joint comprising two bodies, a head formed on one of said bodies and of greater width than the adjoining portion of said body, a curved contact face formed on said head, another contact face, of different contour and in rolling contact with the contact face on said head, and converging members, one on each side of said face of different contour, embracing said head so as to hold said faces in permanent contact.

2. A joint comprising two bodies, a dovetailed head formed on one of said bodies, a curved contact face formed on the outer end of said head, a dovetailed notch formed in the other body, a mating contact face at the bottom of said notch which is of different contour, and in rolling contact with the contact face on said head, the flanks of the dovetailed notch being approximately flat and converging to a point outside of the contact surface, the flanks of the dovetailed head being curved in such a manner as to be in contact with the flanks of the notch in all positions, which the two bodies may assume in swinging relative to one another.

In testimony whereof I affix my signature.

HUGO JUNKERS.